United States Patent [19]

Bergland et al.

[11] Patent Number: 5,664,507
[45] Date of Patent: Sep. 9, 1997

[54] SEED TUBE GUIDE

[75] Inventors: Norman Robert Bergland, Moline; Alfred Dean Yoder, Geneseo, both of Ill.

[73] Assignee: Deere & Company, Moline, Ill.

[21] Appl. No.: 659,054

[22] Filed: Jun. 3, 1996

[51] Int. Cl.⁶ .................................... B65H 3/08
[52] U.S. Cl. .................. 111/140; 111/164; 111/170; 111/177; 111/187; 111/195; 111/200; 222/567; 222/575
[58] Field of Search .................. 111/140, 164, 111/170, 177, 187, 195, 200, 127, 152, 124; 222/567, 566, 575; 221/211, 312 R; 193/2 R, 4, 5; 239/589, 592, 593, 597, 601

[56] References Cited

U.S. PATENT DOCUMENTS

| | | | |
|---|---|---|---|
| 2,724,159 | 11/1955 | Morin | 222/567 |
| 3,155,293 | 11/1964 | Cotter | 111/170 X |
| 4,224,882 | 9/1980 | Cruse | 111/170 X |
| 4,388,878 | 6/1983 | Demzin | |
| 4,520,742 | 6/1985 | Anderson | |
| 4,824,270 | 4/1989 | Clarke | 222/567 X |
| 4,915,258 | 4/1990 | Olson | 221/211 |
| 5,033,398 | 7/1991 | Froc | 111/152 |
| 5,092,255 | 3/1992 | Long et al. | 111/170 X |
| 5,271,343 | 12/1993 | House | 111/170 X |

OTHER PUBLICATIONS

Vacumeter Article, p. 12.

*Primary Examiner*—Terry Lee Melius
*Assistant Examiner*—Christopher J. Novosad

[57] ABSTRACT

The present invention is a seed tube guide for maintaining the seed tube in the center of the seed planting furrow between the double disc openers. The seed tube guide comprises a unitary member having left and right forwardly extending mounting plates for engaging a seed tube guard. Each of the mounting plates has a notch for receiving the transversely extending ridge of the seed tube guard. Extending rearwardly are left and right guide members for gripping the seed tube and centering it in the seed planting furrow.

6 Claims, 3 Drawing Sheets

SEED TUBE GUIDE

BACKGROUND

1. Field of the Invention

The invention is directed to a plastic seed tube guide for keeping the seed tube centered in the seed planting furrow.

2. Description of the Prior Art

Row crop planters generally comprise a transverse toolbar having a series of rearwardly extending planting units. These units have a frame to which is mounted a furrow opener for forming a seed planting furrow in the seedbed. The furrow opener maybe provided with depth control wheels for controlling the depth of the furrow. A seed hopper maybe mounted to the frame and direct seed to a seed meter. The seed meter meters the seed and directs the seed through a seed tube to the seed planting furrow formed by the furrow opener. Following the seed tube and the furrow opener are closing wheels.

In one planter currently on the market, the furrow opener comprises a double disc assembly. The seed tube is positioned between the double discs. A seed tube guard comprising a metal member is positioned in front of the seed tube again between the double discs of the furrow opener. Seed tubes are typically made of plastic. The seed tubes may wear against the rotating disc blades, if the tube does not stay centered in the seed planting furrow. The blades may eventually wear a hole in the seed tube.

SUMMARY

It is an object of the present invention to provide a simple guide for maintaining the seed tube centered in the seed planting furrow.

It is a feature of the present invention that it does not require any mounting fasteners, it is held in place by the adjoining parts.

The present invention is a plastic seed tube guide for maintaining the seed tube in the center of the seed planting furrow between the double disc openers. The seed tube guide comprises a unitary member having left and right forwardly extending mounting plates for engaging a seed tube guard. Each of the mounting plates has a notch for receiving the transversely extending ridge of the seed tube guard. Extending rearwardly are left and right guide members for gripping the seed tube and centering it in the seed planting furrow.

DETAILED DESCRIPTION

Figure 1:
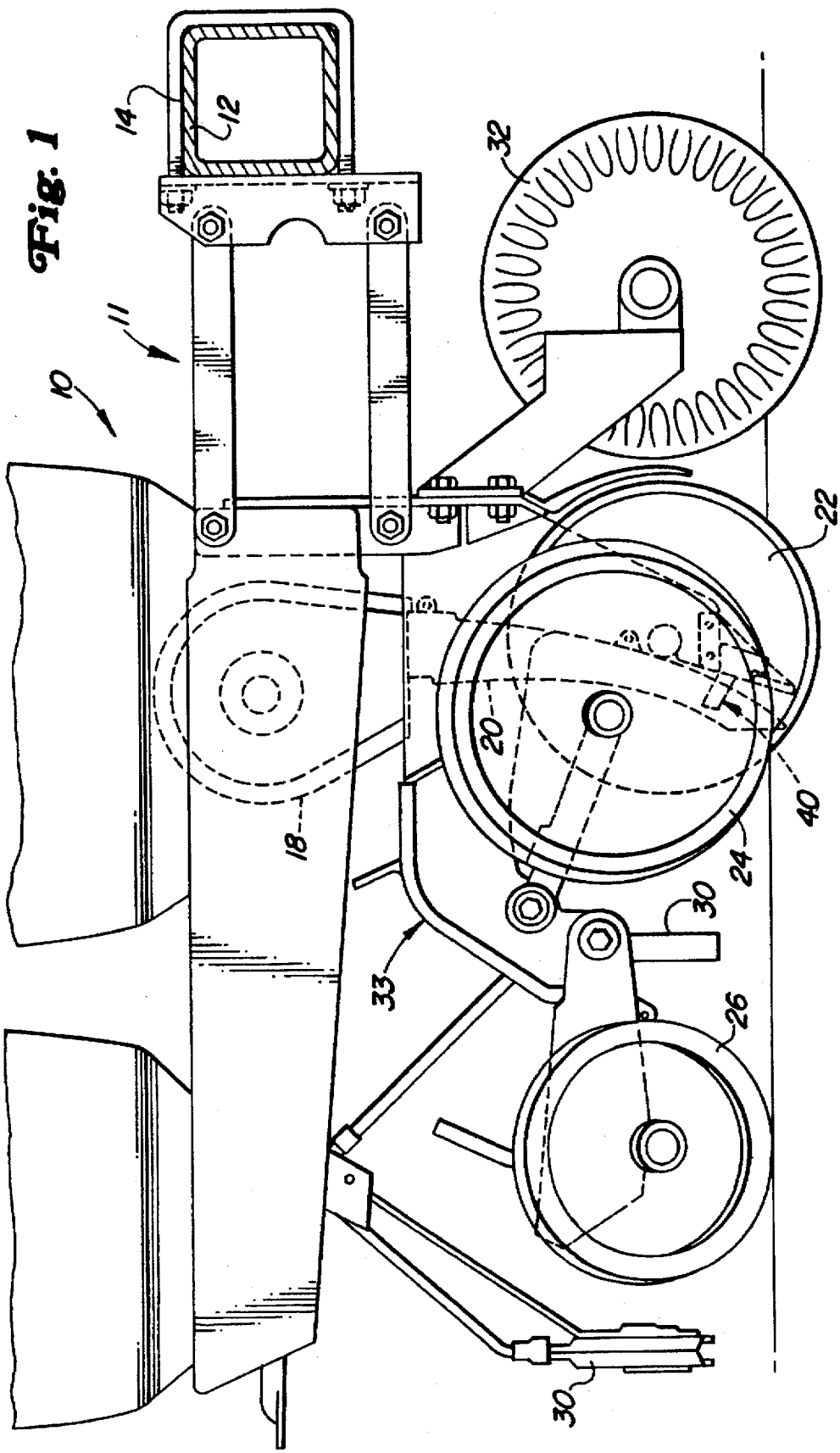
FIG. 1 is a side view of a row crop planter unit.
Figure 2:
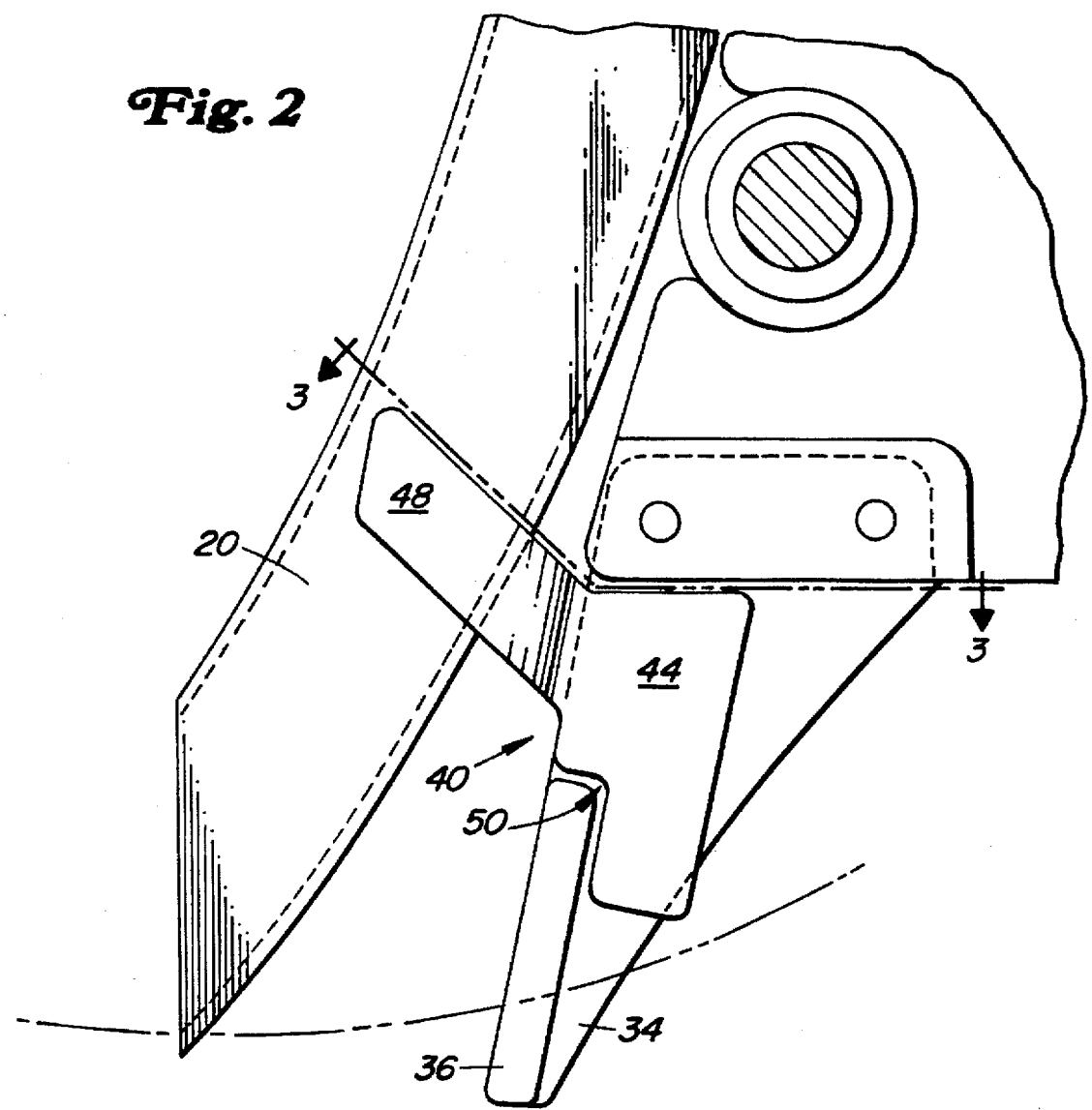
FIG. 2 is a close up side view of the seed tube guide.
Figure 3:
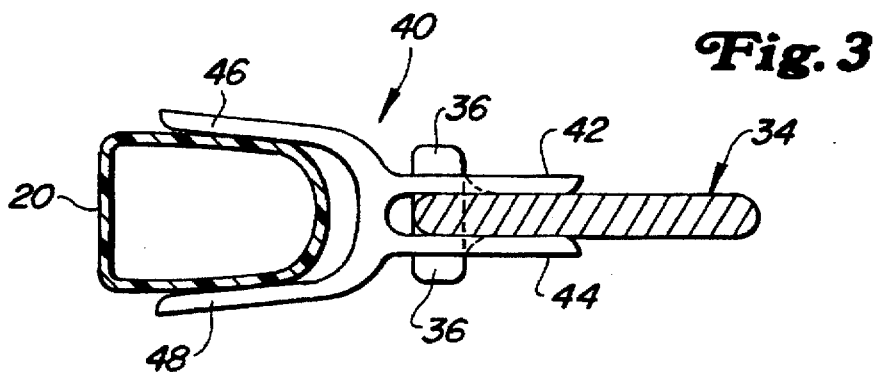
FIG. 3 is a top view of the wheel support member taken along line 3—3.

FIG. 1 discloses an agricultural planting unit 10. The planting unit is provided with a parallel linkage 11 that is mounted to a transverse toolbar 12 by U-bolt 14 in a conventional manner. The planting unit is provided with a seed bin 16 which directs seeds to a seed meter 18. The seed meter 18 directs the measured seeds to a seed tube 20 for placing the seeds in a seed planting furrow. The seed planting furrow is formed by a furrow opener 22. Gauge wheels 24 control the depth of the furrow opener 22. A pair of seed firming wheels 26 close the trench after the seed has been deposited into the trench by the seed tube 20. The illustrated planting unit is also provided with a pesticide bin 28 for directing pesticides to the ground by applicators 30. A suitable pesticide meter (not shown) controls the application of the pesticide. In addition, a bubble coulter 32 is positioned forward of the furrow opener 22 to aid in opening the seed planting furrow. All of these elements are mounted to a planter unit frame 33.

The above disclosed planter is of a relatively conventional configuration. Typically, a plurality of planting units are mounted on toolbar 12 so that a farmer could plant more than one row in a single pass over the field. Although the present invention as illustrated as being mounted to a row crop planting unit 10 it could also be mounted to other seeding equipment like grain drills, and as such, the invention should not be limited to row crop planters.

The planter unit frame is provided with a downwardly depending seed tube guard 34. This guard 34 is positioned immediately in front of the seed tube 20 for protecting the seed tube from forward contact with the seed planting furrow. The guard 34 is provided with a transversely extending ridge 36.

Figure 4:
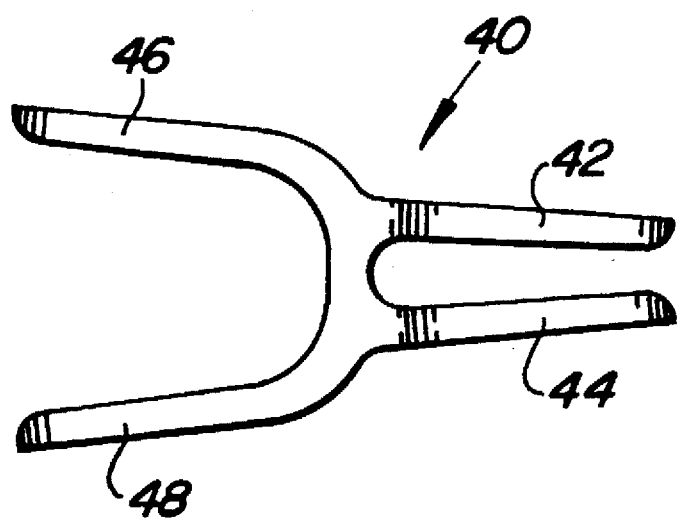
FIG. 4 is a top view of the seed tube guide.

The guide of the present invention is a unitary plastic part 40 having left and right mounting plates 42 and 44, and left and right guide members 46 and 48. Both mounting plates 42 and 44 are provided with notches 50 for accommodating the transversely extending ridge 36 of the seed tube guard 34. As shown in FIG. 4 the mounting plates 42 and 44 are biassed inwardly to better clamp the seed guard 34.

The present seed tube guide is a simple part that cradles the plastic seed tube on the seed planting furrow centerline. This insures better seed spacing and prevents the seed tube wear from the disc blades.

The invention should not be limited by the above described embodiment, but should be limited solely by the claims that follow.

We claim:

1. A seed tube guide for centering a seed tube in a seed planting furrow, the seed tube guide is mounted to a seed tube guard extending downwardly from a planter unit, the seed tube guide comprising:

left and right mounting plates, each of the mounting plates having a notch for receiving a transversely extending ridge on the seed tube guard, the plates clamping the seed tube guard;

left and right guide members joined to the left and right mounting plates for gripping a seed tube therebetween, the left and right guide members extend rearwardly from the left and right mounting plates.

2. A seed tube guide as defined by claim 1 wherein the seed tube guide is plastic.

3. A seed tube guide as defined by claim 2 wherein the left and right mounting plates are biased inwardly for clamping the seed tube guard therebetween.

4. A planter as defined by claim 2 wherein the left and right mounting plates are biased inwardly for clamping the seed tube guard therebetween.

5. A planter for planting seed in a seedbed, the planter comprising:

a frame, the frame having a downwardly extending seed tube guard;

a double disc furrow opener being mounted to the frame for opening a seed planting furrow in the seedbed;

a seed meter being mounted to the frame for metering seed into a seed tube, the seed tube directing the seed into the seed planting furrow formed by the double disc furrow opener;

a closing wheel assembly for closing the seed planting furrow after seeds have been deposited in the seed planting furrow by the seed tube; and a seed tube guide being mounted to the seed tube guard by two notched left and right mounting plates, the plates clamping the seed tube guard therebetween, the seed tube guide having left and right rearwardly extending guide members for gripping the seed tube therebetween.

6. A planter as defined by claim 5 wherein the seed tube guide is plastic.

* * * * *